March 22, 1949.     C. C. ISBELL     2,465,157
OXY-ELECTRIC TORCH
Filed March 14, 1947
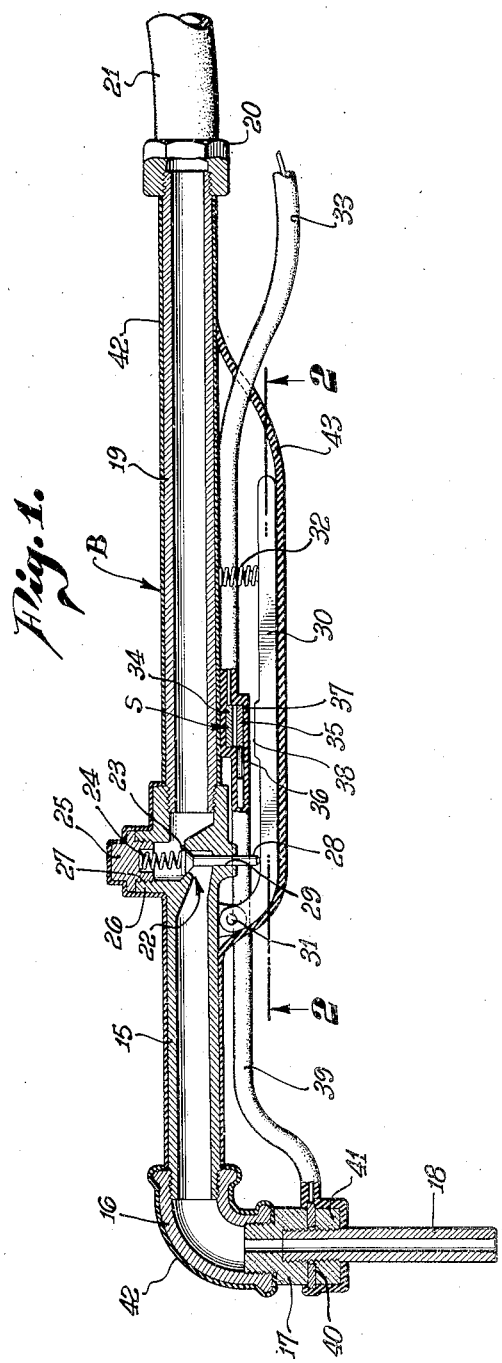
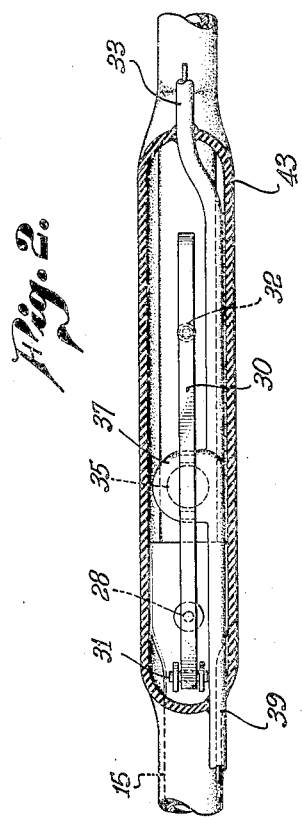
INVENTOR.
Charles C. Isbell
BY
ATTORNEY Patented Mar. 22, 1949

2,465,157

UNITED STATES PATENT OFFICE 2,465,157

OXYELECTRIC TORCH

Charles C. Isbell, Long Beach, Calif.

Application March 14, 1947, Serial No. 734,644

4 Claims. (Cl. 219—15)

My invention relates to torches for cutting metal employing oxygen and electricity, and it has for a purpose the provision of such a torch which is more particularly designed, although not necessarily, for use in cutting metal under water, and is characterized by manually operable means for controlling the supply of oxygen and electric current to the nozzle or electrode of the torch which is so actuatable as to initially compel the supply of oxygen to the torch in advance of the current supply.

The temperature of the arc produced by the electric current alone, is such as to melt the nozzle of the torch or the work to be cut, resulting in closing of the torch nozzle by the melted metal and preventing emission of oxygen from the nozzle. However, by initially supplying only oxygen to the nozzle, the possibility of the nozzle being closed by the melting metal is prevented and thus continuous oxygen flow is insured.

Also, my control means allows discontinuance of the current supply to the nozzle once combustion of the metal being cut is initiated, but with continued oxygen flow to maintain metal combustion.

I will describe only one form of oxygen-electric torch embodying my invention, and will then point out the novel features thereof in claims.

In the accompanying drawings:

Fig. 1 is a view showing in longitudinal section one form of oxygen-electric torch embodying my invention.

Fig. 2 is a longitudinal sectional view taken on the line 2—2 of Fig. 1.

With specific reference to the drawings, my invention in its present embodiment, comprises a body B made up of a relative short length of metal pipe 15 on one end on which is screw-threaded an elbow pipe 16. Screw-threaded in the elbow 16 is a nipple 17 made of any suitable electric insulating material such as Bakelite, while screw-threaded in the nipple is a tubular element 18 made of carbon or steel and which serves the dual purpose of an outlet nozzle and an electrode. Threaded into the other end of the pipe 15 is a length of metal pipe 19 which has threaded on its other end a coupling collar 20 having a flexible hose 21 which is adapted for connection to a source of oxygen supply (not shown).

The pipe 15, adjacent its connection with the pipe 19, is constructed interiorly to provide a port 22 controlled by a valve 23 urged to closed position by an expansible spring 24 held in proper position by a recessed plug 25 which is screw-threaded in a collar 26 forming an opening 27 of the pipe. The mounting of the plug 25 affords an adjustment for the spring 24 to insure closing of the valve.

The valve 23 is provided with a stem 28 movable in and projecting from an opening 29 in the pipe 15, to be engaged by an operating lever 30 pivoted as at 31 on the pipe. This lever is urged outwardly to the position shown in Fig. 1, not only by the spring 24, but by a second expansible spring 32 situated between the lever and the pipe 19 adjacent the free end of the lever. In this urged position of the lever the valve 23 is closed, and it will be understood that by manually pressing the lever inwardly, while gripping the pipe 19, the stem 28 will be moved to open the valve in respect to the port 22.

It will be noted that the valve stem 28 under the action of the spring 24, engages the lever 30 at a point in proximity to the axis of rotation thereof, the length of the radius of said lever at this point of contact defining its circular limit. The movement of the lever 30 in one direction, in consequence, effects the immediate opening or unseating of the valve 23, while in a reverse direction, the lever permits the movement of the valve gradually to its seat.

Electric current of suitable wattage is adapted to be supplied to the nozzle or electrode 18 by a cable 33 which is insulated and secured to the pipe 19 with its free end provided with a stationary and laterally disposed contact 34. Opposite, but normally spaced from the contact 34, is a movable contact 35, the two contacts forming a switch S.

The contact 35 is on the end of a spring arm 36 which urges the contact into a position spaced from the contact 34 so that the switch S is normally open. The two contacts are housed in a covering 37 of insulating material, such as rubber, which is flexible to allow movement of the contact 35 into engagement with the contact 34 when pressure is exerted on the covering 37 at that point by a projection 38 on the lever 30 when the latter is pressed inwardly.

This aforenamed projection 38 is positioned at a greater radial distance on the lever 30, as shown, than the contacting stem 28 of the valve, and, hence, the circular movement of the lever at this point is greater than at the point of contact with the stem 28. The projection 38, being thus farther removed radially from the axis of rotation of the lever 30, will travel circularly a greater distance and in so doing, actuate the switch sequentially to the unseating of the valve, when the lever 30 is moved in one direction. Contrariwise, the movement of the lever in the opposite direction, will first open the switch S, without, however, effecting the open position of the valve and such a position may be readily maintained by the operator by pressure of slight degree on the lever, as later explained.

The spring arm 36 is fixed on one end of an insulated conductor or cable 39 which extends forwardly where it is connected to a metal contact 40 of flat ring form. This contact 40 is secured in contacting relation to the nozzle 18 by a ring nut 41 of metal threaded on the nozzle, the contact being interposed between the nipple 17 and the nut so that when the nut is screwed home the contact will be firmly secured between the two and in contact with the nozzle.

The pipes 15 and 19 are preferably formed of brass or copper to avoid rusting or corrosion, while to protect them and at the same time prevent short-circuiting the body of the torch including the elbow 16, as well as the nut 41 and the contact 40 are covered by a jacket 42 of rubber or other suitable material. Also, the lever 30 and its mounting are covered by a jacket 43 of rubber which is flexible to allow actuation of the lever through the jacket. This jacket 43 is secured at its edges to the body jacket 42, and the cable 33 extends into the jacket for connection to the switch contact 34.

In practice, oxygen or any other suitable gas as supplied to the pipe 19 from the hose 21 can be manually controlled in its passage to and out of the nozzle 18, by opening of the valve 23 through pressing on the lever 30, and, similarly, supply of current to the nozzle so that it functions as an electrode, is controllable by operation of the lever. However, the positioning of the switch S in relation to the lever as against the valve stem 28 and the lever, is such that a slight pressure on the lever will open the valve 23 without moving the contact 35 into engagement with the contact 34. Thus oxygen can be supplied to the nozzle without supplying current thereto, for the switch S remains open.

This mode of operation is an important feature of my invention, because in the use of the torch if, in initiating operation thereof in respect to a piece of work to be cut particularly under water, electric current is supplied to the nozzle alone or concurrently with oxygen the temperature of the resultant arc is such as to melt the metal of which the nozzle is formed or that of the work. In either event the fluid metal will close the nozzle and prevent the flow of oxygen therefrom. By permitting oxygen to be supplied to the nozzle before the current is supplied, the cooling action of the oxygen will prevent melting of the metal, and when the current is supplied to the nozzle to ignite the oxygen and initiate combustion of the metal of which the work is formed, the nozzle will remain unobstructed and oxygen emission will be insured.

Once combustion of the work metal has taken place, the use of further current is unnecessary, so that the switch S can now be opened. Such switch opening is effected without closing the valve 23 by relieving the lever of hand pressure in an amount sufficient to allow the contact 35 to move out of engagement with the contact 34, but insufficient to allow the valve 23 to close. Thus oxygen flow alone to the nozzle, can be maintained to carry on combustion of the work metal and effect cutting thereof.

Although I have herein shown and described only one form of oxy-electric torch embodying my invention, it is to be understood that various changes and modifications may be made therein without departing from the spirit of my invention and the spirit and scope of the appended claims.

I claim:

1. An oxygen-electric torch, including: a tubular body having a nozzle on one end thereof, and means for connecting an oxygen supply hose to the other end thereof to supply oxygen to said nozzle; a valve for controlling the passage of oxygen through said body to said nozzle; an electric conductor secured in spaced relation to said valve and insulated from said body and connected to said nozzle, for supplying current to the nozzle; a switch interposed in said conductor and urged to open position; a spring urging said valve to closed position; a stem fixed to said valve; and a lever pivoted for axial rotation on said body said valve stem and switch being disposed in spaced relation along said lever, whereby axial movement in one direction of said lever will actuate said stem and open said valve and close said switch, and in the other direction allow opening of said switch without allowing closing of said valve.

2. In an oxygen-electric torch: an outlet nozzle for oxygen; a valve on the torch for controlling the passage of oxygen to said nozzle from a source of oxygen supply; a stem on said valve, means for supplying electric current to said nozzle, including a switch on the torch; a lever pivoted at one end for rotation relatively to said body, said valve stem having contact with said lever near the pivot thereof, and said switch being spaced from said stem at a point in the radial extent of said lever, whereby movement of said lever circularly in one direction will first open said valve and then close said switch and in another direction will open said switch without closing said valve.

3. In an oxygen-electric torch: an outlet nozzle for oxygen; a valve urged to closed position on the torch, for controlling the passage of oxygen to said nozzle from a source of oxygen supply; means for supplying electric current to said nozzle, including a switch on the torch urged to open position and spaced from said valve; and manually operable means on the torch so disposed with relation to said valve and switch that movement thereof in one direction will open said valve and sequentially close said switch, and in another direction will hold open said valve and substantially simultaneously open said switch.

4. In an oxygen-electric torch: an outlet nozzle for oxygen, a lever pivoted at one end on said torch for rotational movement relative thereto; a valve having a stem urged to closed position and contact with said lever near the pivotal connection thereof for controlling oxygen flow to said nozzle; means for supplying electric current to said nozzle, including a switch spaced from said valve and from said lever, said lever being manually operable in one direction to effect opening of said valve and closing of said switch and vice versa to maintain open said valve while opening said switch.

CHARLES C. ISBELL.

REFERENCES CITED

The following references are of record in the file of this patent:

UNITED STATES PATENTS

| Number | Name | Date |
| --- | --- | --- |
| 2,082,904 | Pondany | June 8, 1937 |
| 2,206,549 | McIntosh et al. | July 2, 1940 |
| 2,376,692 | Hein | May 22, 1945 |
| 2,395,228 | Lininger | Feb. 19, 1946 |
| 2,405,406 | Combridge | Aug. 6, 1946 |

FOREIGN PATENTS

| Number | Country | Date |
| --- | --- | --- |
| 237,552 | Great Britain | Aug. 6, 1925 |